United States Patent [19]

Pujari

[11] Patent Number: 4,843,041

[45] Date of Patent: Jun. 27, 1989

[54] PROCESS FOR SEPARATING SHORT FIBERS

[75] Inventor: Vimal K. Pujari, Northboro, Mass.

[73] Assignee: Norton Company, Worcester, Mass.

[21] Appl. No.: 866,806

[22] Filed: May 27, 1986

[51] Int. Cl.$^4$ ............................................. C04B 35/02
[52] U.S. Cl. ...................................... 501/95; 501/103
[58] Field of Search ................... 209/268, 269, 5, 235; 501/95, 103

[56] References Cited

U.S. PATENT DOCUMENTS

| | | | |
|---|---|---|---|
| 4,463,058 | 7/1984 | Hood et al. | 75/229 |
| 4,543,345 | 9/1985 | Wei | 501/95 |
| 4,695,695 | 9/1987 | Meek et al. | 501/95 |

OTHER PUBLICATIONS

Claussen, Nils; "Strengthening Strategies for $ZrO_2$-Toughened Ceramics at High Temperatures", Materials Science and Engineering 71 (1985), pp. 23-38.
Claussen et al.; "Tetragonal Zirconia Polycrystals Reinforced with S.C. Whiskers", J. Am. Ceramic Society 69(3), 288-92 (1986).
Toughening Behavior in SiC-Whisker-Reinforced Alumina, Paul F. Becher and George C. Wei., Communications of the American Ceramic Society.
How to Use Short Fiber Reinforcements Efficiently by John V. Milewski, 37th Annual Conference, Reinforced Plastics/Composites Institute, The Society of the Plastics Industry, Inc., Jan. 11-15, 1982.
Problems and Solutions in Using Short Fiber Reinforcements by John V. Milewski, 37th Annual Conference, Reinforced Plastics/Composites Institute, The Society of the Plastics Industry, Inc., Jan. 11-15, 1982.
Efficient Use of Whiskers in the Reinforcement of Ceramics, John V. Milewski, Consultant, Los Alamos, N.M., Advanced Ceramic Materials, vol. 1, No. 1, 1986.

Primary Examiner—Mark L. Bell
Attorney, Agent, or Firm—Arthur A. Loiselle, Jr.

[57] ABSTRACT

Fibers for use in forming fiber reinforced ceramic composites may be effectively deagglomerated and/or dispersed in the precursor from which the continuous phase of the composite is to be derived by passing the fibers through a screen with openings that are from two to ten times as wide as the fiber diameter. By using this technique, composites of alumina fibers in a partially stabilized zirconia matrix have been prepared with better fiber orientation and fiber aspect ratio than previously achieved.

12 Claims, 1 Drawing Sheet

PROCESS FOR SEPARATING SHORT FIBERS

BACKGROUND OF THE INVENTION

1. Field of the Invention

This invention relates to the field of ceramic composites which comprise a continuous phase and a discontinuous phase, with the discontinuous phase having the form of elongated fibers. Such materials are generally denoted in the art as fiber reinforced composites. The continuous phase may be ceramic, metal, or less often some other material such as a thermosetting resin or a thermoplastic.

2. Technical Background

In general, the fibrous phase in a fiber reinforced composite is more expensive and stronger than the continuous phase. When this is true, the economically optimum physical properties for any given amount of fibrous phase are achieved when the fibers are separately and uniformly distributed throughout the continuous phase and when the aspect ratio, defined as the length to width ratio of the fibers, is at least fairly high. Theoretically, the highest possible aspect ratio is desirable, but above a certain limit there is little if any practical improvement. Because a very high aspect ratio makes uniform distribution very difficult, a practical compromise is generally made between uniformity of distribution and aspect ratio, so that aspect ratios of 15–50 are generally preferred.

Additional general background is available in two papers by John Milewski, "Problems and Solutions in Using Short Fiber Reinforcements", Session 18-C, and "How to Use Short Fiber Reinforcements Efficiently", Session 18-A&B, both in the Proceedings of the 37th Annual Conference, Reinforced Plastics Composites Institute, The Society of the Plastics Industry, Inc., held Jan. 11–15, 1982. These references are designated herein as Milewski I and Milewski II respectively. Another reference, more specific to ceramics, is John Milewski, "Efficient Use of Whiskers in the Reinforcement of Ceramics", 1 *Advanced Ceramic Materials*, No. 1, p. 36 (1986). This is designated herein as Milewski III.

Achieving or even approaching the optimum distribution of most ceramic reinforcing fibers is difficult in practice. The process of manufacture of fibers often produces bundles, particular when the fibers are the specially strong type known as whiskers. See Milewski III, p. 36. Even if the manufacturing process does not produce bundled fibers directly, fibers with high aspect ratios tend to clump spontaneously because of mechanical entanglement. Id. The fiber bundles or clumps must be broken up to achieve efficient distribution of the fibers.

Two methods have commonly been used in the prior art both to break up the bundles of fibers and to mix them into a dispersion suitable for molding: ball milling and liquid dispersion. Ball milling has the disadvantage that it is likely to break many of the fibers, thereby reducing the average aspect ratio and leading to an undesirably wide distribution of aspect ratios for the individual fibers. Ball milling may also damage fibers in such a way as to reduce their strength, even if the fibers remain intact. Liquid dispersion requires a solvent and a dispersing aid, and effective solvents and dispersing aids are not always easy to find. Little guidance from theory is available for the choice. Also, the solvent generally must be substantially removed before a suitable coherent green body can be formed from the dispersion. This requires an additional processing step and thus increases costs.

A combination of both common methods is taught by U. S. Pat. No. 4,463,058 of Jul. 31, 1984 to Hood et al. This reference describes deagglomerating silicon carbide fibers by dispersing them in a polar solvent and ball milling the resulting dispersion until it is deagglomerated, adding metal powder either dry of in slurry to the deagglomerated silicon carbide fiber dispersion, removing the bulk of the polar solvent by distillation or drying, and molding and eventually sintering the almost dry dispersion formed by removing most of the polar solvent.

Another methods of dispersion taught in the prior art is ultrasonic dispersion, which is recommended by the Milewski III reference, p. 38. and by P. Becher and G. Wei, "Toughening Behavior in SiC-Whisker-Reinforced Alumina", *Communications of the American Ceramic Society*, December 1984, p. C-267.

SUMMARY OF THE INVENTION

It has been found that passing fibers through a fine screen is a more effective method of breaking up fiber bundles than those previously used. The fibers are caused to move through the screen by the combined effects of gravity and mechanical agitation or fluid pressure. Such screening also has been found to cause a fairly uniform decrease in fiber aspect ratio with each pass, so that a narrower eventual range of fiber aspect ratios can be achieved than with practical prior art fiber dispersion methods. This method permits higher and more uniformly distributed fiber contents and higher final sintered densities in the eventual composites than prior art methods.

DESCRIPTION OF THE PREFERRED EMBODIMENTS

Figure 1A:

Normally, the preferred method of causing the fibers to pass through the screen is mechanical rubbing of the fibers against the screen. Depending on circumstances such as the particular fiber chemistry, the fibers may be advantageously screened either dry or wet and either with or without being mixed with the powder from the which continuous phase of the eventually desired composite is eventually to be derived. In general, screening dry and without mixing with any other material is more effective in breaking up the fiber bundles but also more likely to reduce the aspect ratio. Screening after mixing with the powder to form the continuous phase is less effective at breaking up bundles but very effective and useful for dispersing the fibers uniformly within the eventual continuous phase. Both dry and wet screening may often be advantageously combined as successive operations on the same lot of fibers.

The screen used preferably has opening which are between two and ten times as large in area as the cross sectional area of the fibers. For certain readily available alumina fibers, for example, with a fiber cross sectional diameter of about 20 microns, screens between 100 and 325 mesh were effectively used. A 100 mesh screen has opening about 150 microns across, and a 325 mesh screen has openings about 43 microns across. The screens are preferably constructed of stainless steel or brass. The screening technique has been used to make improved composites of alumina fiber in conventional partially stabilized zirconia and of silicon carbide fibers in silicon and silicon nitride matrixes. However, it is widely applicable to almost any ceramic fiber and with any continuous phase material which is most conveniently made by pressing and/or sintering a fine powder of the continuous phase material eventually desired, or by reactively bonding fine powders of a precursor material of the material eventually desired for the continuous phase.

The scope of the invention may be further appreciated from the following example.

EXAMPLE 1

Chopped alumina fibers with a diameter of about 20 microns and an initial length of about 3 mm were used for this example. The fibers were supplied by E. I. duPont de Nemours & Co. and were reported by the supplier to have a Young's modulus of about 380 gigapascals (GPa), a tensile strength of 1.4-2 GPa, a coefficient of thermal expansion of $6 \times 10^{-6}/°$ C., a density of 3.9 gm/cm$^3$, and an alumina purity of more than 99.9%. A 325 mesh screen was preferred, and it was found that each dry screening pass reduced the average aspect ratio of the fibers by about half until an aspect ratio below 30 was reached. The reduction in aspect ratio with each pass depends on the relation between the size of the openings in the screen and the original length of the fibers.

For the preferred composite product, a sample of the alumina fibers described above was screened once dry. The fibers were gently rubbed against the screen until all or nearly all of them passed through the screen. These once screened fibers were then mixed with partially stabilized zirconia (PSZ) powder in a mass ratio of 15 parts of fibers to 85 parts of powder. Two types of commercial PSZ powder, shown in Table 1, were used, with little noticeable difference in the properties of the resulting composite.

TABLE 1

CHEMICAL AND PHASE COMPOSITIONS OF PSZ POWDERS

| Average Particle Size, Microns | Volume % Tetragonal | Mole % $Y_2O_3$ | Weight % of Impurities | | | | |
|---|---|---|---|---|---|---|---|
| | | | $Al_2O_3$ | $SiO_2$ | $Fe_2O_3$ | $Na_2O$ | CaO |
| 0.94 | 68 | 3.5 | 0.05 | 0.30 | 0.003 | 0.02 | 0.036 |
| 1.49 | 75 | 3.0 | 0.07 | 0.01 | 0.002 | 0.001 | — |

Note:
Balance of the phase volume is monoclinic.

The screened fiber and the powder were mixed by tumbling them together in a plastic jar. The mixture of powder and once screened fiber was then passed again through the same screen, again by gently rubbing the mixture agains the screen. The screened dry mixture of powder and fiber was first isostatically pressed at 300n megapascals (MPa) at normal ambient temperature and subsequently isostatically pressed at 1550° C. and 200 MPa in an argon atmosphere to its final density, which was about 95% of the theoretical density.

Figure 1B:
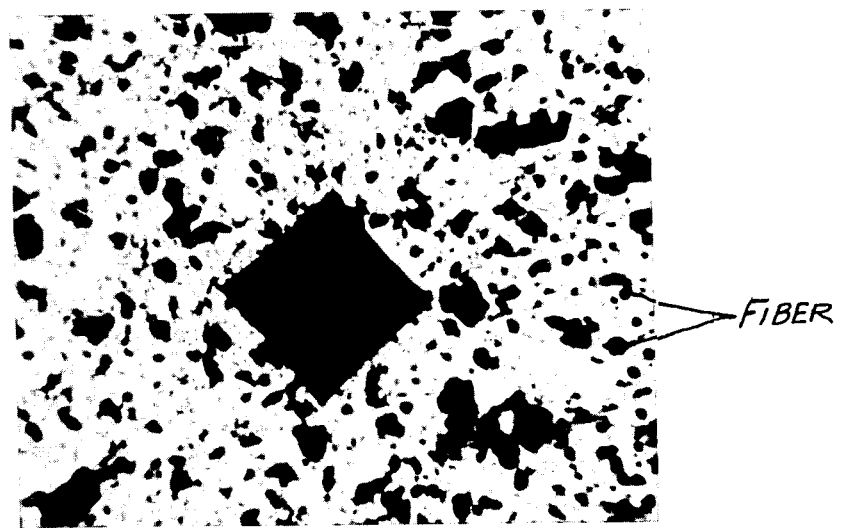

A photomicrograph of the composite made as described above is shown in FIG. 1(a), while a composite made from similar materials after the fibers where dispersed by conventional ball milling is shown in FIG. 1b. It is obvious from comparison of the two parts of the figure that the technique according to this invention results in a more uniform and longer fiber length, nearer to the optimum aspect ratio, and more uniform dispersion of the fibers within the final composite. In particular, examination of FIG. 1(a) shows that at least one quarter of the apparent fiber cross sections have an aspect ratio of at least 2, while no more than one tenth of the apparent fiber cross sections in FIG. 1(b) have this large an aspect ratio, in large part because of clumping which produces many apparent fiber cross sections that are substantially larger in every dimension in the plane shown than the diameter of an individual fiber of the type used in this composite.

What is claimed is:

1. A process for separating individual short fibers which spontaneously tend to clump together under normal gravitational force, comprising passing said fibers through a screen having substantially uniform openings with a width between two and ten times the diameter of the cross section of the fiber.

2. A process according to claim 1, wherein said fibers are dispersed in a liquid during their passing through said screen.

3. A process according to claim 2, wherein said fibers are mixed, during their passing through said screen, with a powder suitable for later processing to form the continuous phase of a fiber reinforced composite product.

4. A process according to claim 1, wherein said fibers are mixed, during their passing through said screen, with a powder suitable for later processing to form the continuous phase of a fiber reinforced composite product.

5. A process according to claim 4, wherein said fibers consist essentially of alumina and have a diameter of about 20 microns.

6. A process according to claim 3, wherein said fibers consist essentially of alumina and have a diameter of about 20 microns.

7. A process according to claim 2, wherein said fibers consist essentially of alumina and have a diameter of about 20 microns.

8. A process according to claim 1, wherein said fibers consist essentially of alumina and have a diameter of about 20 microns.

9. A process according to claim 6, wherein said powder consists essentially of partially stabilized zirconia.

10. A process according to claim 5, wherein said powder consists essentially of partially stabilized zirconia.

11. A process according to claim 4, wherein said powder consists essentially of partially stabilized zirconia.

12. A process according to claim 3, wherein said powder consists essentially of partially stabilized zirconia.

* * * * *